United States Patent
Gonsior

[11] Patent Number: 5,346,172
[45] Date of Patent: Sep. 13, 1994

[54] SERVO VALVE

[75] Inventor: Wolfgang Gonsior, Lindau-Bodolz, Fed. Rep. of Germany

[73] Assignee: Gulde Regelarmaturen GmbH & Co. KG, Ludwigshafen, Fed. Rep. of Germany

[21] Appl. No.: 46,732

[22] Filed: Apr. 16, 1993

[30] Foreign Application Priority Data

Apr. 28, 1992 [DE] Fed. Rep. of Germany ....... 4213957

[51] Int. Cl.⁵ ..................... F16K 31/12; F16K 31/145
[52] U.S. Cl. .................................. 251/58; 251/61.4; 251/243; 251/285; 251/335.3
[58] Field of Search ................. 251/58, 234, 243, 285, 251/61.4, 285, 335.3; 137/454.6

[56] References Cited

U.S. PATENT DOCUMENTS

| | | |
|---|---|---|
| 1,622,151 | 3/1927 | Joyce ..................................... 251/58 |
| 1,975,656 | 10/1934 | Irvin . |
| 2,657,710 | 11/1953 | Latour . |
| 2,680,451 | 6/1954 | Hill . |
| 2,716,394 | 8/1955 | Ray . |
| 2,895,501 | 7/1959 | Irwin . |
| 2,925,987 | 2/1960 | Preismeyer ......................... 251/61.4 |
| 3,151,531 | 10/1964 | Ray . |
| 3,602,478 | 8/1971 | Cairns .................................... 251/58 |
| 3,667,722 | 6/1972 | Katz et al. . |
| 3,689,025 | 9/1972 | Kiser ................................... 251/61.4 |
| 4,050,670 | 9/1977 | Borg et al. ........................... 251/231 |
| 4,069,839 | 1/1978 | Hughes . |
| 4,343,224 | 8/1982 | Kemmler . |
| 4,687,017 | 8/1987 | Danko et al. ..................... 251/335.3 |

FOREIGN PATENT DOCUMENTS 2149915 4/1972 Fed. Rep. of Germany .
553373 5/1943 United Kingdom .

Primary Examiner—A. Michael Chambers
Attorney, Agent, or Firm—Evenson, McKeown, Edwards & Lenahan

[57] ABSTRACT

A servo valve comprising a drive for moving a valve spindle (6) coupled through a lever and a link body with the drive. The lever (34) is pivotably mounted in a lever housing (30) which is connected at one end to the valve housing (2) and at its other end to a housing (54) of the drive, and a position controller (114) is disposed on the lever housing (30). The servo valve has a compact and enclosed design and can be economically manufactured and assembled.

27 Claims, 5 Drawing Sheets

SERVO VALVE

BACKGROUND OF THE INVENTION

The invention relates to a servo valve comprising a valve housing, a valve spindle movable axially within said housing, a drive for operating said spindle, and a position controller for actuating said drive depending on the position of said spindle, and in particular to a servo valve with a drive especially adapted for pneumatic operation.

Servo valves of this kind are disclosed, for example, in Kemmler, U.S. Pat. No. 4,343,224. In this valve design the diaphragm drive is connected by a yoke to the valve housing. The diaphragm drive and the diaphragm are coaxial with the axially displaceable valve spindle which is coupled directly with the diaphragm plate. Beside the yoke is a position controller which by means of a lever detects the stroke of the valve spindle. The bulk, and especially the height, are comparatively great, primarily because of the open fitting of the diaphragm drive to the valve housing and the freely accessible detection of the spindle position by means of the lever of the position control. This open method of construction can lead to difficulties in practice, especially in the application of protective paints to entire apparatus, and accidental losses of adjustment.

Irwin, U.S. Pat. No. 2,895,501 discloses a pressure control with an integrated diaphragm drive, which can be used especially in gas lines for stoves or water heaters. When the valve is open, one chamber of the diaphragm drive is pressurized by the pressure of the medium which flows through the valve, while the other chamber is subjected to pressure in order to open the valve, for example, the pressure of water to be heated. By means of a lever the diaphragm drive shifts the valve body in accordance with the equilibrium of the forces that establishes itself on the diaphragm. Changes in pressure in the chambers corresponding to the momentary pressures of the gas and of the water directly produce a change in the position of the valve body, and it is not easily possible to establish a precise flow cross section through the valve.

A flow controller is also disclosed in Katz et al, U.S. Pat. No. 3,667,722 which has a lever in a sealed chamber which is inserted between an electromagnetic servo drive and a valve. The servo drive contains a pin having a rounded tip which is in contact with one end of the lever. There is no means for detecting the axial position of the valve spindle, nor is there a position controller. Since the pin of the servo drive and also the valve spindle are only touching the lever, additional measures are necessary in order, for example, to maintain contact between the pin and the lever when pin is moving away from the lever.

Finally, a valve operating apparatus is disclosed in Latour, U.S. Pat. No. 2,657,710. The valve body is a component of a piston which is axially displaceable in a cylinder and is biased by a spring. The spring is disposed in a chamber of the cylinder, and this chamber is in communication with a venting valve. The venting valve can be operated by means of an electromagnetic drive and a lever, and the valve movement is limited by means of screws and springs. The position of the valve body integrated into the piston cannot be defined in advance, inasmuch as the valve configured in this manner is either fully open or fully closed, and defined intermediate positions are not easily established.

SUMMARY OF THE INVENTION

It is the object of the present invention to provide an improved servo valve of the aforementioned type.

Another object of the invention is to provide a servo valve which has a compact, enclosed structure.

A further object of the invention is to provide a servo valve which can be economically manufactured and assembled.

An additional object of the invention is to provide a servo valve which assures reliable and trouble-free position control.

It is also an object of the invention to provide a servo valve which is resistant to undesirable effects of external influences.

Yet another object of the invention is to provide a servo valve which has a high degree of accuracy and operating reliability and a long useful service life.

These and other objects of the invention are achieved by providing a servo valve comprising a valve housing, a valve spindle movable axially within the housing, a drive for operating the spindle, and a position controller for actuating the drive depending on the position of the spindle, wherein the valve spindle is operatively coupled to the drive by a lever and a link body; the lever is pivotally mounted in a lever housing interposed between the valve housing and the drive with one end of the lever housing connected to the valve housing and the other end of the lever housing connected to a housing for the drive, and the position controller is disposed on the lever housing.

The proposed valve with the integrated drive and position controller has a compact construction and occupies little space. Due to the lever interposed between the valve spindle and the drive, which advantageously may be configured as a pneumatic diaphragm drive, a closing or opening large force can be applied with a comparatively small drive having a small diaphragm. The drive has great accuracy and long useful life, assuring economical manufacture and assembly. The proposed servo valve has a large adjustment ratio and high accuracy of adjustment, an adjustment ratio up to 1:100 being reliably achieved with a compact and economical design. Desirably, the drive does not have a separate guiding means, so that low friction is assured. Between the lever and the valve spindle, guiding means are disposed such that only substantially axial forces act on the valve spindle through the lever in order to move it. Thus, transverse forces on the spindle are avoided, so that the seals through which the valve spindle passes into the valve housing are not additionally stressed and a long useful life and reliable operation are assured. Furthermore, an equalizing coupling can be disposed between the lever and the valve spindle to compensate for any offset between the guiding elements and the valve spindle. The complexity of manufacture and assembly are reduced because manufacturing tolerances or misalignments between the lever housing and the valve housing can easily be compensated for through the guiding elements and/or the coupling, and particularly those which are transverse to the direction of movement of the axially moving valve spindle are at least considerably reduced and ultimately prevented. As a result of the leverage ratio, the spring contained in the servo drive can be much softer inasmuch as the stiffness of the spring is related to the square of the leverage ratio. Since the spring of the servo drive, which advantageously is configured as a diaphragm drive, is considerably softer, in comparison with direct spindle actuation, transverse forces are virtually eliminated. The manner of operation can be easily inverted simply by shifting the pivot point of the lever.

The lever is mounted in an enclosed housing which forms the connection between the valve housing and the servo drive. The housing containing the lever, hereinafter referred to as the lever housing, also contains the means for connection to the upper part of the valve housing, and, advantageously, a spindle coupling to take up transverse forces. The lever housing contains an enclosed chamber for the lever which lies substantially transverse to the axis of the valve spindle as well as the axis of the servo drive, these axes advantageously being parallel and spaced apart from one another. The lever housing contains an additional chamber aligned substantially parallel to the valve spindle, in which the valve spindle and, in some cases, parts of a guiding system and coupling with the lever, are disposed. Overall, the lever housing with its two chambers has an L-shaped configuration and, at least in the case of smaller valve sizes, namely down to nominal widths of 50 mm, it is constructed in one piece. For larger nominal widths, the lever housing can be made of two parts, each containing one of the chambers and being releasably connected to the other.

Furthermore, a position controller is directly fastened to the lever housing, the movement detection being made through the lever and/or its pivot shaft. An integrated position controller adaptation is thus provided in which in which the position of the valve spindle is detected indirectly, the housing containing the lever advantageously having a connection for the air overflow of the position controller. The position controller is disposed on one side of the lever housing where it seals off the lever housing. Also, an additional safeguard against atmospheric effects on the components on the unpressurized side of the positioning drive and in the lever housing is assured by means of the overflow air. In an advantageous manner, all internal spaces of the servo drive and of the lever housing chamber containing the lever are protected against outside air, thereby achieving considerable advantages as regards reliability of operation and useful life.

In one advantageous embodiment, the servo valve is provided with a bellows seal. Since the length of a bellows seal is substantially proportional to the stroke of the valve spindle, the proposed combination with the leverage ratio and the resultant shortening of the stroke correspondingly decreases the length of the bellows. Thus, the upper part which advantageously contains the bellows can be made smaller in accordance with the leverage ratio, and so in general can the height. Hence an economical bellows valve is provided which satisfies safety requirements, in particular the requirements of the German ordinance TA-LUFT (Technical Regulations - Air) or comparable regulations applicable in foreign countries. Likewise, due to the leverage ratio a high accuracy of adjustment is assured, since the position controller is coupled on the side of the servo drive, which because of the leverage ratio moves a greater distance than the valve spindle.

Further improvements and preferred embodiments of the invention are described in detail below.

BRIEF DESCRIPTION OF THE DRAWINGS

The invention is described in further detail with reference to illustrative preferred embodiments shown in the accompanying drawings, without being limited thereto. In the drawings.

DETAILED DESCRIPTION OF PREFERRED EMBODIMENTS

Figure 1:
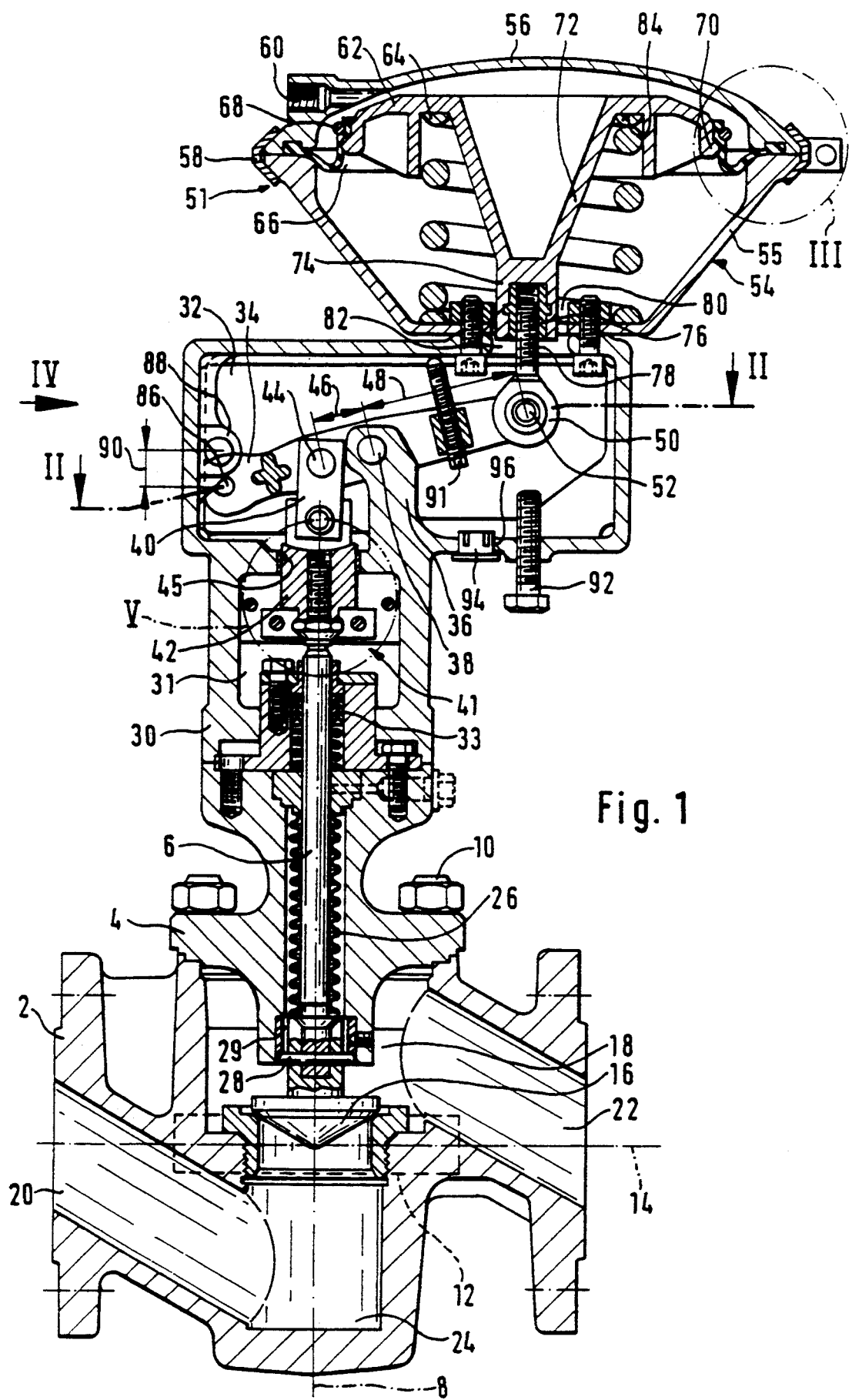
FIG. 1 is a longitudinal section through the valve, the lever housing, and the diaphragm driver.

FIG. 1 shows a longitudinal sectional view of a forged valve housing 2 having an upper or top part 4 in which a valve spindle 6 is disposed for axial movement in the direction of a spindle axis 8. The top part 4 is joined by bolts 10 to a flange 12 which is disposed approximately in the center of the housing 2 and through which the longitudinal axis 14 runs. In the interior, downstream from the valve cone 16, the valve housing 2 has an expansion chamber 18 with a large volume. With this large expansion chamber, especially good rheological characteristics are achieved. The transformation energy available in the forging process goes into the production of the large expansion chamber 18, while the inlet opening 20 and the outlet opening 22 are produced by boring. The connecting chamber 24 lying at the end of the inlet opening, coaxial with the expansion chamber 18, can be made in the forging process and/or by boring.

The valve upper part 4 contains a bellows 26 for sealing the spindle. Since the valve spindle 6, due to the leverage ratio to be explained later, performs a short stroke, the bellows has a comparatively short length in the direction of the valve axis 8. Thus, the valve upper part and the servo valve in general have a considerably reduced height in comparison with known, directly driven bellows valves. Preferably, a means to prevent rotation is provided for the valve spindle 6. For this purpose a pin 28, which is provided for connecting the valve spindle 6 to the valve cone 16, is guided by both its extremities in longitudinal grooves 29 with respect to the upper part. Because of this anti-rotational means, the bellows is not exposed to torsion forces, which has a favorable effect on its life and its reliability. Even though the safety standards, especially TA-LUFT, are quite well satisfied by the bellows seal, where the standards are less strict some other sealing means, such as a conventional packing or an O-ring, for example, can be provided for sealing the spindle, and in such embodiments the length of the upper part 4 and thus of the entire servo valve can be further reduced.

A lever housing 30 is affixed to the valve upper part 4 and contains a first chamber 31 coaxial with the spindle axis 8 and a transversely oriented second chamber 32. At the bottom end of the first chamber 31 a safety seal 33 is provided. Here a safety seal 33 with spring-loaded upper packing is illustrated, which account for a large percentage of the great variety of packing types.

Such a construction is basically quite reliable as long as no transverse forces arise in the upper packings. Useful measures for avoiding transverse forces will be described hereinafter in conjunction with FIG. 5. In the second enclosed chamber 32 a lever 34 is mounted on a support 36 for pivotal movement about a shaft 38. The support 36 is advantageously fork-like, the lever 34 being disposed between the two arms which are spaced apart transverse to the plane of the drawing. The valve spindle 6 is connected and linked to the lever 34 through a link 40 and a coupling 41 with a guide block 42, a first length or lever arm 46 being present between the ink pin 44 and the pivot shaft 38. Guiding surfaces 45 in the lever housing are associated with the guiding block 42. The guiding means provided in this way assure that the connected valve spindle will not be subjected to transverse forces, and substantially only axial forces will be exerted by the lever on the valve spindle. By means of the coupling 41 any axial offset between the valve spindle 6 and the guiding means, which in this case take the form of the guiding block 42 and the guiding surfaces 45, will be compensated for, so that, even if the coaxial alignment between the guiding means and the valve spindle 6 is not precise, they will not be subjected to any bending forces or transverse forces.

The guiding means, in particular the guiding block 42 and the guiding surface 45, are advantageously disposed in the vicinity of the wall between the two chambers 31 and 32. Thus the sealing of the enclosed chamber 32 is simultaneously assured, at least to the extent that no foreign bodies can get into the chamber 32. Exhaust air from the position controller which may flow into the enclosed chamber 32, however, can escape. It is to be understood that it is within the scope of the invention to arrange the guiding means other than between the two chambers, e.g. entirely in one or the other of the chambers, in which case sealing means in the form of rings or the like are preferably provided between the two chambers 31 and 32.

At the other end of the lever 34 (the right end in the drawing), a link 50 is arranged for rotation about a shaft 52 at a second distance 48. Lever 34 is connected with the servo drive 51 through this link body 50 of this forked joint. In the illustrated preferred embodiment, servo drive 51 is a diaphragm drive. The second distance 48 is greater than the first distance 46, and consequently a large force can be applied to the valve spindle 6 by a relatively small servo drive 51 by means of this advantageous lever transmission.

Figure 3:
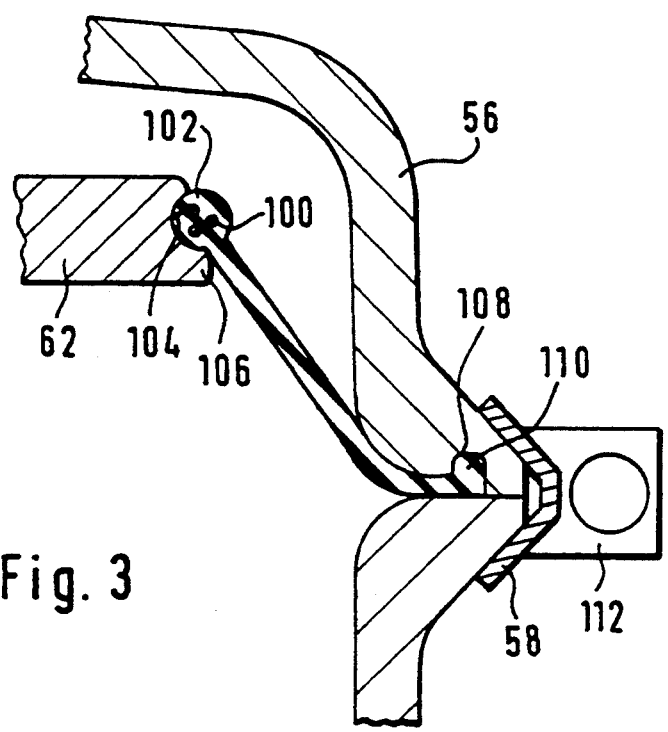
FIG. 3 is an enlarged view of section III of FIG. 1.

The leverage of lever 34 enables the diameter of the diaphragm of the servo drive, and consequently the diameter of the diaphragm housing 54, to be substantially reduced in accordance with the leverage ratio. The diaphragm housing 54 comprises a lower housing part 55 and an upper housing part 56, which are joined tightly together by means of a clamping band 58. The upper housing part 56 contains a connection 60 for a pressure medium, while on the inside of housing 54 a diaphragm spring plate 62 is supported by means of a compression spring 64. In consideration of the leverage ratio, the spring 64 has a relatively low stiffness. In this way transverse forces are largely avoided in an especially advantageous manner. It is therefore unnecessary to employ special measures to guide the moving drive part, i.e. the servo drive 51, and the negative effects of friction are avoided. By means of the overall low-friction lever drive, a significantly reduced hysteresis is achieved. An annular membrane or flexible ring 66 has an outer margin which is clamped between the two housing parts 55 and 56 and an inner margin which is held by a securing ring 68 against the outer margin 70 of the diaphragm plate 62. The securing ring 68 may advantageously take the form of a steel ring and has a high resistance to stretching. The high resistance of the securing ring to stretching makes it possible to reliably attach the flexible annular diaphragm ring 66 to the outer periphery of the diaphragm plate 62. This preferred design enables simple and reliable attachment of the diaphragm and facilitates easy assembly and disassembly of the diaphragm without any need for extra safety components. Alternatively, instead of the steel ring 68 shown in FIG. 1, one or more reinforcing wires may be embedded in the inner margin of the flexible annular diaphragm ring as shown in FIG. 3.

The diaphragm spring plate 62 comprises an inner portion 72 surrounded by the spring 64 and having a bottom portion 74 with a threaded sleeve 76 into which the link body 50 of the forked link is screwed by means of an external thread 78. The diaphragm spring plate 62 is thus supported and guided by the lever 34, and an annular gap 80 allows for sufficient transverse movement of the end 74 of the inside portion 72 with respect to the bottom opening of the lower housing part 55 and an opening 82 in the lever housing 30. As explained hereinafter, the position controller is disposed directly on the lever housing, and its air overflow is delivered into the enclosed second chamber 32. This integrated arrangement of the position controller enables the air overflow from the position controller to provide additional protection against atmospheric influences on the components disposed in the second, enclosed chamber 32. From the second chamber 32 the air overflow passes further through the annular gap 80 to the unpressurized side of the diaphragm drive, so that the components there are likewise protected against atmospheric influence and the corrosion which it entails.

The diaphragm housing 64 with housing parts 55 and 56 and the diaphragm spring plate 62 can be made of metal materials or of nonmetallic materials, such as glass-fiber reinforced plastic in particular. Important is the comparatively small diaphragm diameter, while still making it possible because of the leverage ratio to apply the necessary adjusting forces to the valve spindle 6. The diaphragm 66 is arranged comparatively low, i.e., it is spaced axially, with respect to the bottom contact surface 84 of the diaphragm spring plate 62 for the compression spring 64. Thus a substantially uniform effective area is provided for the diaphragm over the length of the stroke of the diaphragm spring plate 62, and with regard to the low adjusting force of the diaphragm 66 with respect to the contact surface 84 of the spring 64.

There are no guides on the pressure medium side of the diaphragm spring plate, while the overflow air, which finds its way into the area of the lower half of the housing on the side of the diaphragm that is free of the operating medium, reliably protects the components located there against undesirable effects, particularly the effects of a corrosive atmosphere.

The lever 34 has a free hole 86 (shown at the left of the drawing), while the lever housing 30 has a second pivot support 88 in chamber 32. As can be seen from the drawing, the free hole 86 is spaced a distance 90 from the second pivot support 88, in the direction of the spindle axis 8. This second pivot support 88, like the first pivot support 36, is configured as a fork between the two arms of which the end of the lever 34 with the hole 86 can be disposed. To invert or reverse the direction of operation of the servo valve, lever 34 can be fastened by means of a pin to the second pivot support 88 instead of to the first pivot support 36. In the unpressurized state, the valve spindle 6 with the attached valve cone 16 is then lifted by the aforementioned distance 90, so that the adjusting valve closes when the pressure is applied. Due to this special configuration, therefore, it is possible to reverse the direction of action of the valve in a simple manner without taking the diaphragm housing apart. Also, when the lever 34 is connected to the second forked pivot support 88, the lever arm of the connection to the valve spindle 6 is considerably shorter than the lever arm of the pivot of the link body 50.

Also, two adjusting screws 91 and 92 are provided. By means of the first adjusting screw 91, which can be turned in threads in the lever 34, an upper stop for the stroke can be established, while a lower stop for the stroke of lever 34 and of the adjusting spindle 6 can be established by means of the second adjusting screw 92 which can be rotated in the housing. Thus, integrated means for setting adjustable minimum and maximum limits to control the amount of flow through the servo valve are achieved without incurring a high manufacturing cost. The second chamber 32 of the lever housing 30 contains a venting device 94. This venting device 94 is inserted in a bore 96 in the lever housing 30 and enables the overflow air from the position controller introduced into the second chamber to escape. The bore 96 is advantageously located with respect to the first adjusting screw 91 so that, when the plastic plug containing the venting device 94 is removed, a screwdriver can be inserted through the bore 96 to turn the adjusting screw 91.

Figure 2:
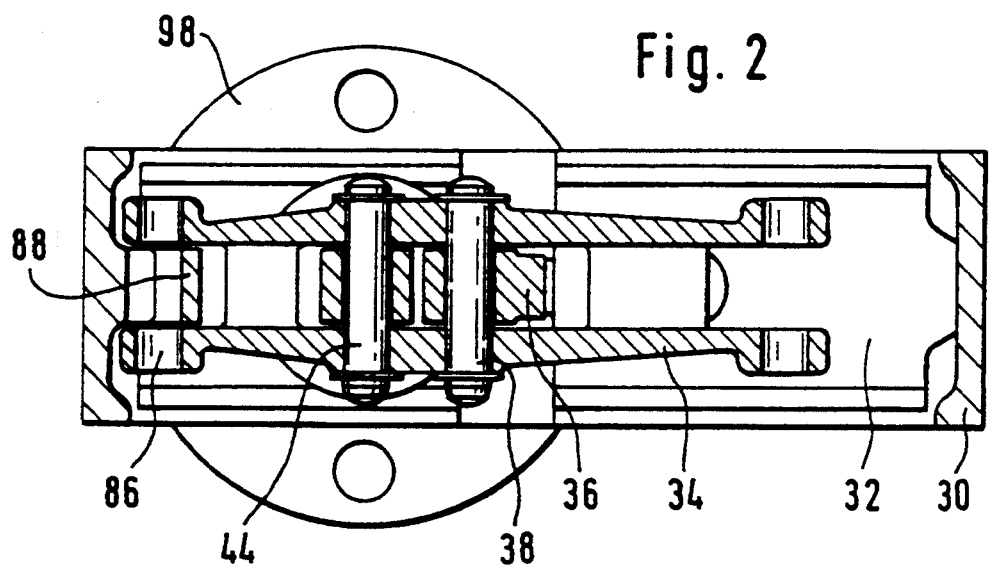
FIG. 2 is an enlarged view of a section along line II of FIG. 1.

FIG. 2 shows a section through the chamber 32 of the lever housing 30, without the link body of the forked linkage. Between the two parallel parts of the double-armed lever 34 can be seen the first pivot support 36, the link 40 and the corresponding pivot pins 38 and 34. The reversal of the direction of action explained above is performed by moving the pin 38 to the second pivot support 88 and free bores 86 of lever 34. The lever housing 30 contains at the bottom a flange 98 by means of which it can be attached to the upper part of the valve.

FIG. 3 is an enlarged view of a further embodiment of the diaphragm showing how the flexible annular diaphragm ring 66 is fastened to the diaphragm spring plate 62. Instead of the steel ring described above and illustrated in FIG. 1, individual circumferential wires 100 are integrated into the inner margin 102 of the annular diaphragm ring 66. The margin 102 preferably takes the form of an annular bead which is engaged in an outwardly facing, annular groove 104 in the diaphragm spring plate 62. As can be seen in the drawing, on the unpressurized side of the diaphragm spring plate 62 there is an annular protuberance 106 which assures a reliable seating. If a pressure medium is introduced into the chamber between the upper half of the housing and the diaphragm 66, the diaphragm margin 102 is pressed securely against the outwardly projecting protuberance 106. The outside diameter of the protuberance 106 and the diameter of the aforementioned wires 100 are coordinated in order to assure a reliable and tight seating. The same applies with regard to the steel ring and the radially outwardly extending protuberance of the diaphragm spring plate provided in the embodiment illustrated in FIG. 1. To fix the outer margin of the diaphragm ring 66, the upper housing half 56 has an annular groove 108 in which an annular bead 110 on the outer margin of the diaphragm ring 66 is received. A clamping lock 112 for the clamping band 58 can also be seen in FIG. 3. The diaphragm drive can be assembled and/or disassembled without difficulty and without any need for special tools or accessory devices.

Figure 4:
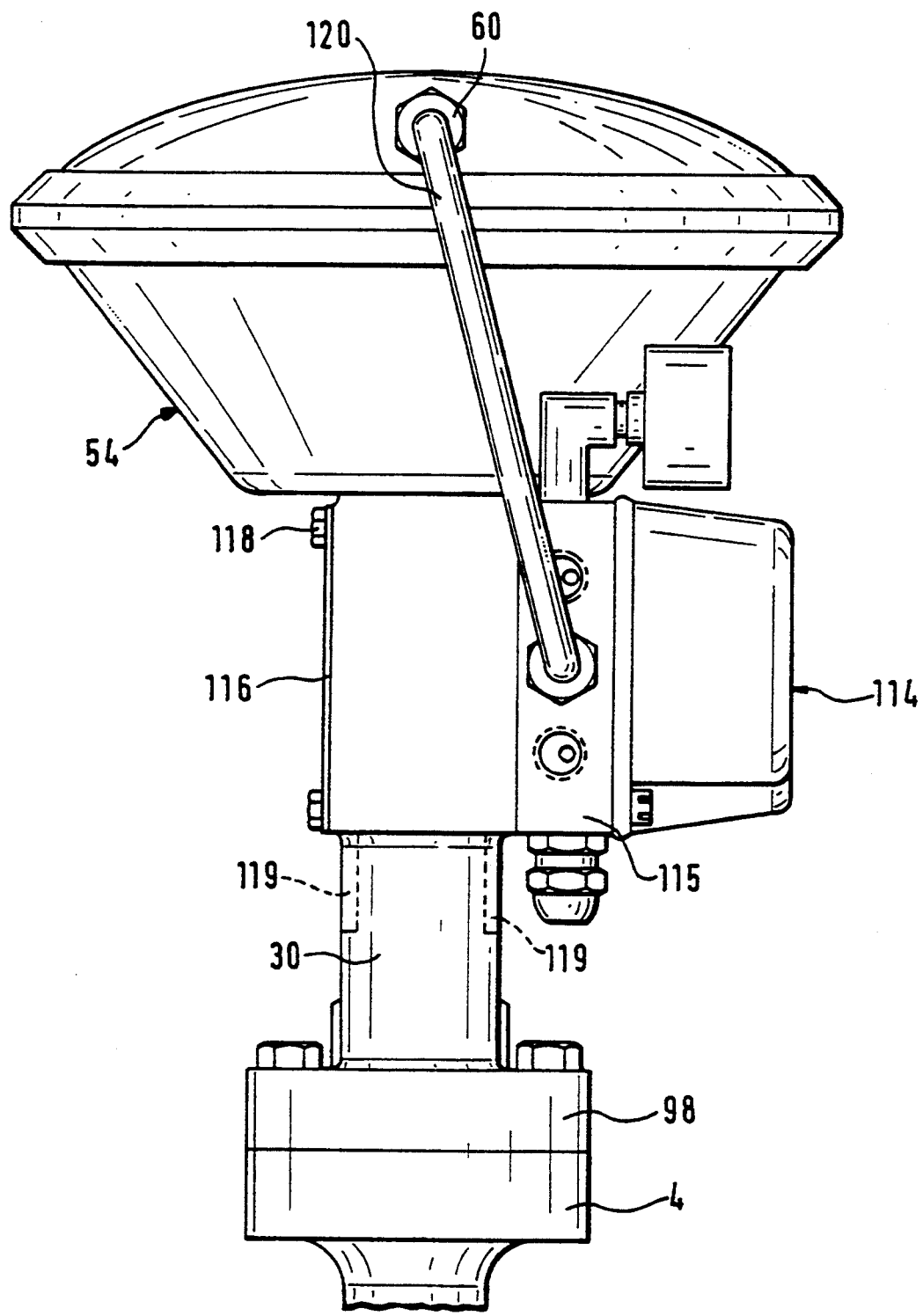
FIG. 4 is a partial view in the direction IV of FIG. 1.

FIG. 4 shows a side view of the housing 54 of the servo drive 51 and of the lever housing 30, to which the position controller 114 is directly mated in an especially compact manner. The position controller 114 has a plate 115 which is tightly attached to the lever housing 30. The electropneumatic or pneumatic position controller 114 tightly seals one side of the second chamber 32 of the lever housing 30. On the other side a cover 116 is provided, which is attached with screws 118. A good sealing of the enclosed second chamber 32 of the lever housing 30 can be assured by means of gaskets (not shown). Chamber 32 is readily accessible by removing the cover 116 in order, for example, to enable the direction of action to be reversed by shifting the lever fulcrum. Moreover, the position of the valve spindle 6 is sensed directly at the lever 34 in chamber 32. On the other hand, the first chamber 31 of the lever housing 30 is not enclosed, but instead is partially open. A cover plate 119 is provided on each side of chamber 31. These cover plates 119 extend only over part of the total height of chamber 31. To prevent accidents the size or height of the cover plates 119 is made such that it is virtually impossible to insert, e.g. a finger, into chamber 31.

A line 120 connects the position controller 114 to the diaphragm drive 54, whereby line 120 is tightly connected in a known manner to the connection 60. As can be seen, the lever housing 30 is directly attached via flange 98 to valve upper part 4. Because of the position controller 114 is directly fitted to the lever housing 30, and particularly in the immediate vicinity of the enclosed chamber 32, its air overflow can easily be introduced into chamber 32 to flush or purge it. It is to be noted that, to this extent, there is a connection between the position controller 114 and the lever housing 30. Optionally, the lever housing and unpressurized parts of the diaphragm drive can flushed by means of nitrogen or a pressure medium, appropriate connections being readily provided for this purpose.

Figure 5:
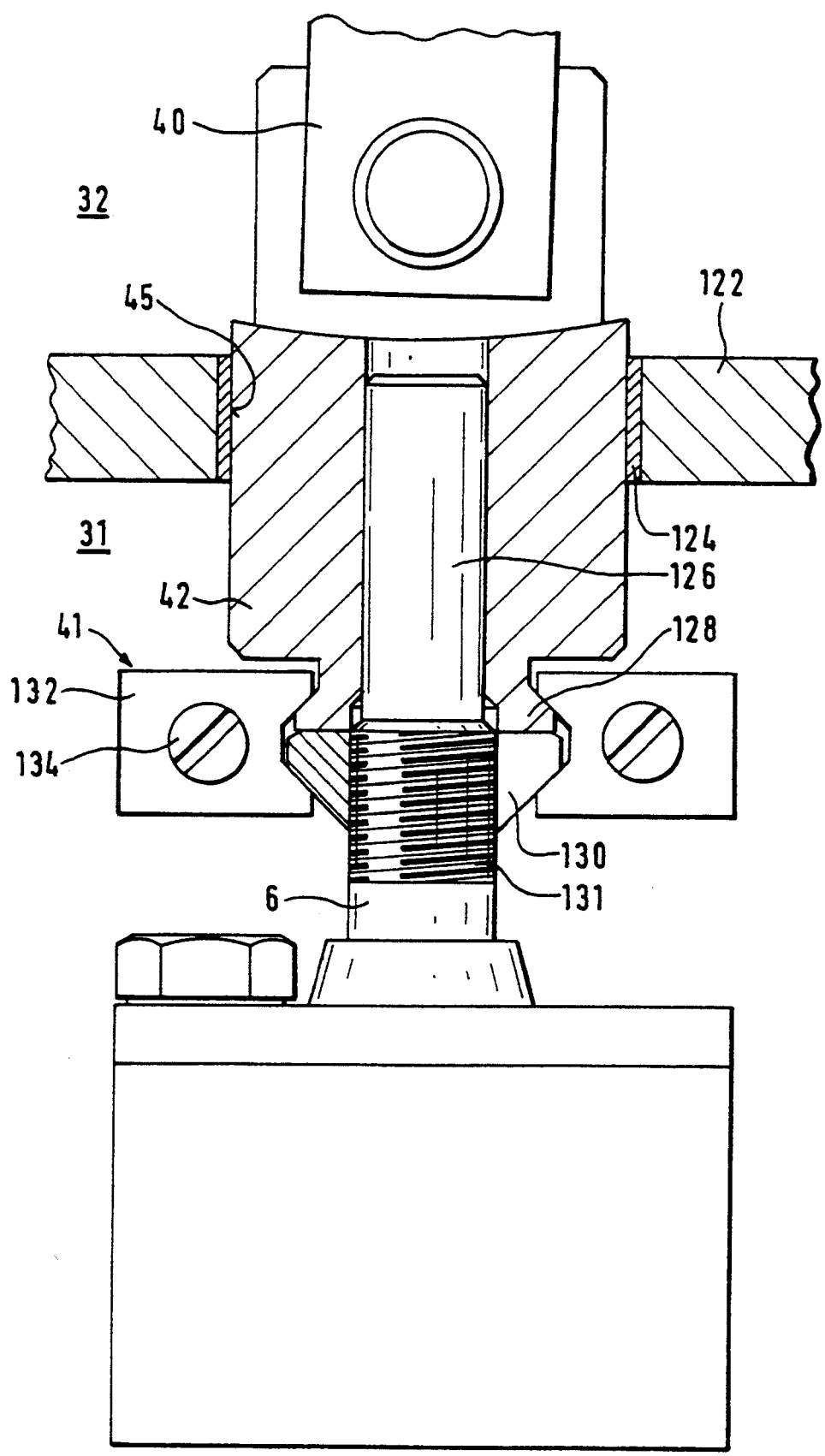
FIG. 5 is an enlarged view of a section V of FIG. 1.

FIG. 5 shows an especially advantageous coupling of the valve spindle 6 to the diaphragm drive via the guide block 42 and the lever 34 (not shown in this figure). In the figure, the dividing wall 122 between the first chamber 31 and the second chamber 32 of the lever housing can be seen. The dividing wall 122 contains a bore with a guide bushing 124 with a guiding surface 45 for the guide block 42. The guide block 42 is provided with a central bore into which the valve spindle engages via a shank 126. Shank 126 is tightly fitted in guide block 42. The guide block 42 is precisely guided in the lever housing, and transverse forces are effectively compensated for in general, and are kept away from the valve spindle 6 and the safety seal 33. The guide block 42 contains at its bottom end a centering cone 128 which cooperates with a slotted cone nut 130. The cone nut 130 is a slotted and conically turned standard nut which is threaded on the external thread 131 of the valve spindle 6. The centering cone 128 and the cone nut 130 are clamped together by means of two coupling sections 132 and screws 134, whereby rotational and axial movements are prevented by means of the slotted cone nut 130. In contrast to enclosed chamber 32, chamber 31 is open on its sides which lie parallel to the plane of drawing, so that the coupling 41 described above can be easily inspected and adjusted. The coupling 41 is self-centering and assures high concentricity so that ease of assembly and adjustment are also assured. The combination of the fit between the shank 126 and the central bore of the guide block 42, and also the guidance of the guide block in the lever housing, assures very precise guidance of the spindle 6 free of transverse forces.

Figure 6:
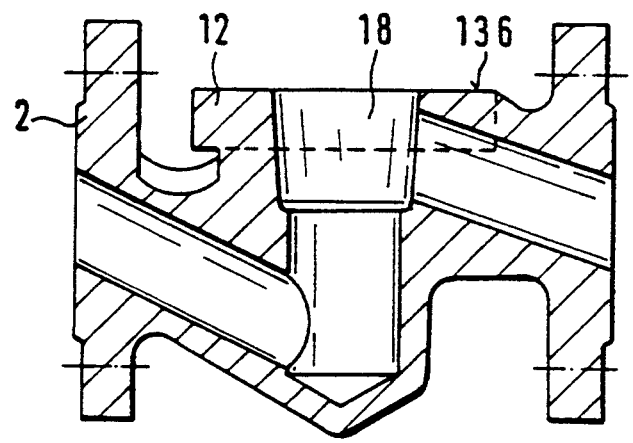
FIG. 6 is a longitudinal section through a known lubricated valve housing.

FIG. 6 shows a known valve housing 2 made by forging. Such a housing can be forged from a solid body and then bored out. The flange 12 required for attachment of the valve upper part is disposed adjacent the top margin 136 of the housing. The expansion chamber 18 has a comparatively small volume, which is disadvantageous for the rheological characteristics.

Figure 7:
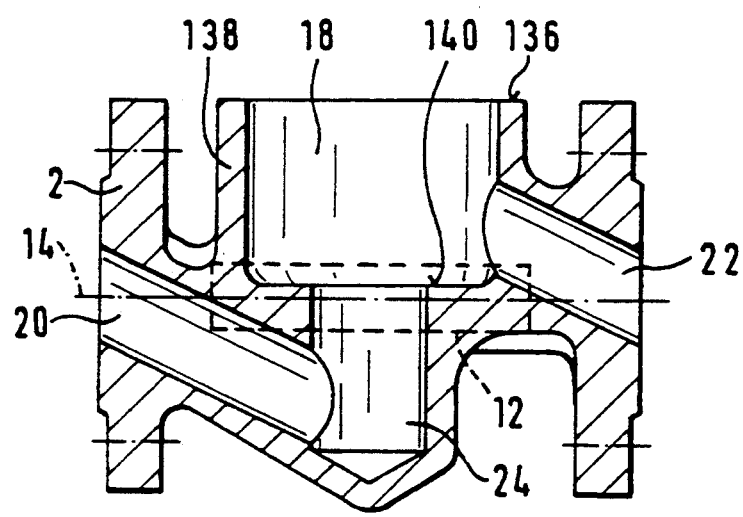
FIGS. 7 and 8 are, respectively, a longitudinal section and a top view of the valve housing according to the invention.
Figure 8:
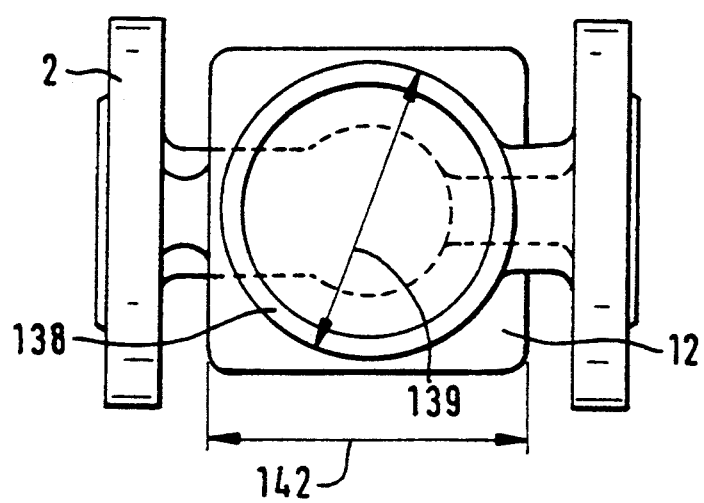

In FIGS. 7 and 8 the valve housing 2 according to the invention is shown with a large expansion chamber 18. The expansion chamber 18 is surrounded by a substantially cylindrical wall 138. The connecting flange 12 is not at the top margin 136, but instead near the bottom 140 of the expansion chamber. The wall 138 has a substantially uniform thickness over its entire height. In the forging, the available transformation energy is utilized substantially for producing the large expansion chamber, and the inlet opening 20, the outlet opening 22, and the connecting chamber 24 are produced afterward by boring. Since the housing flange 12 is arranged in the center of the housing or in the vicinity of the longitudinal axis, no disadvantageous limitations arise during the forging. The outside diameter 139 of the wall 138 is substantially equal to the length 142 of the outside edges of the approximately square housing flange 12.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A servo valve comprising a valve housing, a valve spindle movable axially within said housing, a drive for operating said spindle, and a position controller for actuating said drive depending on the position of said spindle, wherein said valve spindle is operatively coupled to said drive by a lever and a link body; said lever is arranged in a lever housing, having first and second chambers, interposed between said valve housing and said drive with one end of said lever housing connected to said valve housing and another end of said lever housing connected to a housing for said drive, said valve spindle partially projecting into said first chamber; a guide block, which couples between said valve spindle and said lever is slidably guided in said lever housing, said second chamber of the lever housing having a support on which said lever is pivotally mounted, and said position controller is directly connected to said lever housing and closes off said second chamber via a plate.

2. A servo valve according to claim 1, wherein said valve is pneumatically operated.

3. A servo valve according to claim 1, wherein two pivot supports are arranged in said second chamber, and said lever can be selectively mounted in either of said two pivot supports to reverse the operation of said valve.

4. A servo valve according to claim 1, wherein said position controller directly connected to said lever housing tightly closes one side of said second chamber and a separate cover is provided which tightly closes an opposite side of said second chamber.

5. A servo valve according to claim 4, wherein said drive is a pneumatic diaphragm drive, and said plate contains a connection for overflow air from said position controller, whereby overflow air can pass through said connection into said second chamber and into an unpressurized part of said pneumatic diaphragm drive.

6. A servo valve according to claim 1, wherein said position controller detects the stroke of said valve spindle indirectly through said lever or through the pivot axis of said lever.

7. A servo valve according to claim 1, wherein said lever comprises a first lever arm for actuating said valve spindle and a second lever arm for actuating said link body connected to said drive, said first lever arm being substantially shorter than said second lever arm.

8. A servo valve according to claim 1, further comprising at least one adjustable motion limiter associated with said lever.

9. A servo valve according to claim 8, wherein said adjustable motion limiter is an adjusting screw rotatably mounted in said housing and which bears against said lever when said lever reaches a predetermined limit of travel.

10. A servo valve according to claim 8, wherein said adjustable motion limiter is an adjusting screw rotatably mounted in said lever and which bears against said housing when said lever reaches a predetermined limit of travel.

11. A servo valve according to claim 1, further comprising a coupling provided between said lever and said spindle.

12. A servo valve according to claim 1 wherein said first chamber is divided from said second chamber by a dividing wall, and wherein said guide block coupled to said spindle and to said lever extends through said dividing wall, said guide block being movable in the direction of the axis of said spindle.

13. A servo valve according to claim 12, further comprising a guide bushing in said dividing wall for guiding said guide block.

14. A servo valve according to claim 12, wherein the guide block is coupled to said spindle by a shank on said spindle received in a bore in said guide block.

15. A servo valve according to claim 1, wherein said lever housing is provided with a flange which is directly connected to an upper part of said valve housing.

16. A servo valve according to claim 1, wherein said drive comprises a pneumatic diaphragm arranged in a diaphragm housing, said diaphragm housing comprising lower and upper housing parts clamped together by a clamping band.

17. A servo valve according to claim 16, wherein said drive further comprises a spring arranged in said diaphragm housing for biasing said diaphragm in a desired direction, said spring having a relaxed length such that said diaphragm housing can be opened without special tools.

18. A servo valve according to claim 17, wherein said diaphragm spring plate has an outer margin provided with a radially outwardly extending protuberance against which pressure applied to said diaphragm urges said flexible annular ring.

19. A servo valve according to claim 16, wherein said diaphragm comprises a flexible annular ring having an outer margin secured to said diaphragm housing and an inner margin secured to a centrally disposed diaphragm spring plate.

20. A servo valve according to claim 1, wherein said valve housing has a constricted throat and an expansion chamber downstream of said throat in the direction of flow of material through said servo valve, said expansion chamber being surrounded by a cylindrical wall having substantially uniform thickness throughout its height.

21. A servo valve according to claim 20, wherein said valve housing is provided with a substantially square housing flange for connection to an upper housing part, said housing flange having an edge length substantially equal to the outside diameter of said cylindrical wall surrounding said expansion chamber.

22. A servo valve according to claim 1, wherein said valve housing has an upper margin and is provided with a housing flange for connection to an upper housing part, said housing flange being spaced away from said upper margin of said valve housing.

23. A servo valve according to claim 1, wherein said valve housing is provided with a housing flange for connection to an upper housing part, said housing flange lying substantially adjacent a central longitudinal axis of said valve housing.

24. A servo valve according to claim 1, further comprising a bellows for sealing said valve spindle to a portion of said valve housing.

25. A servo valve according to claim 24, wherein said bellows is disposed in an upper part of said valve housing having a relatively short length in the direction of the axis of said spindle.

26. A servo valve comprising a valve housing, a valve spindle movable axially within said housing, a drive for operating said spindle, and a position controller for actuating said drive depending on the position of said spindle, wherein said valve spindle is operatively coupled to said drive by a lever and a link body; said lever is pivotally mounted in a lever housing interposed between said valve housing and said drive with one end of said lever housing connected to said valve housing and another end of said lever housing connected to a housing for said drive and said position controller is disposed on said lever housing;

wherein said lever is arranged in an enclosed lever chamber in said lever housing;

wherein said lever housing comprises a spindle chamber into which a part of said valve spindle extends, said spindle chamber being divided from said lever chamber by a dividing wall;

wherein a guide block coupled to said spindle and to said lever extends through said dividing wall, said guide block being movable in the direction of the axis of said spindle; and wherein said guide block is provided with a centering cone which lies adjacent a slotted cone nut, and said slotted cone nut is threaded onto an external thread of said spindle and clamped to said centering cone concentrically therewith by a coupling.

27. A servo valve comprising a valve housing, a valve spindle movable axially within said housing, a drive for operating said spindle, and a position controller for actuating said drive depending on the position of said spindle, wherein said valve spindle is operatively coupled to said drive by a lever and a link body; said lever is pivotally mounted in a lever housing interposed between said valve housing and said drive with one end of said lever housing connected to said valve housing and another end of said lever housing connected to a housing for said drive, and said position controller is disposed on said lever housing;

wherein said drive comprises a pneumatic diaphragm arranged in a diaphragm housing, said diaphragm housing comprising lower and upper housing parts clamped together by a clamping band;

wherein said diaphragm comprises a flexible annular ring having an outer margin secured to said diaphragm housing and an inner margin secured to a centrally disposed diaphragm spring plate; and wherein said inner margin of said annular ring is received in an annular groove in said diaphragm spring plate, and at least one reinforcing wire is provided in said inner margin to render said inner margin resistant to stretching.

* * * * *